(12) United States Patent
Parker et al.

(10) Patent No.: US 10,738,552 B1
(45) Date of Patent: Aug. 11, 2020

(54) MODULAR MANAGED PRESSURE DRILLING CHOKE SYSTEM

(71) Applicant: OPTIMAL PRESSURE CONTROL LLC, Fort Smith, AR (US)

(72) Inventors: Martyn Parker, Fort Smith, AR (US); Benjamin Micah Spahn, Alma, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 139 days.

(21) Appl. No.: 15/896,042

(22) Filed: Feb. 13, 2018

Related U.S. Application Data

(60) Provisional application No. 62/469,258, filed on Mar. 9, 2017, provisional application No. 62/458,451, filed on Feb. 13, 2017.

(51) Int. Cl.
*E21B 21/10* (2006.01)
*G05D 7/06* (2006.01)
*F16K 31/02* (2006.01)

(52) U.S. Cl.
CPC ............ *E21B 21/106* (2013.01); *F16K 31/02* (2013.01); *G05D 7/0664* (2013.01)

(58) Field of Classification Search
CPC .................................................... E21B 21/106
See application file for complete search history.

(56) References Cited

U.S. PATENT DOCUMENTS

| | | | |
|---|---|---|---|
| 2014/0033842 A1* | 2/2014 | Morin | F16H 19/04 74/89.17 |
| 2016/0108699 A1* | 4/2016 | Martino | E21B 34/02 166/91.1 |
| 2017/0010139 A1* | 1/2017 | Vilstrup | E21B 47/10 |

* cited by examiner

*Primary Examiner* — Kristyn A Hall
(74) *Attorney, Agent, or Firm* — Schrantz Law Firm, PLLC; Stephen D. Schrantz

(57) ABSTRACT

The modular managed pressured drilling system provides multiple skids with individual chokes and PRVs on the skids. These skids secure to one another to construct a modular MPD system that provides the proper equipment for the drilling operation. An inlet flow block and an outlet flow block are secured to each skid. The flow blocks provide multiple apertures to provide different pathways for the drilling fluid through the flow blocks. The flow blocks may direct the fluid through a first choke, a second choke, a pressure relief valve, or a bypass.

20 Claims, 16 Drawing Sheets

MODULAR MANAGED PRESSURE DRILLING CHOKE SYSTEM

CROSS-REFERENCE TO RELATED APPLICATIONS

This application is a continuation in part of U.S. Patent Application Ser. No. 62/469,258 entitled MODULAR MANAGED PRESSURE DRILLING CHOKE SYSTEM filed on Mar. 9, 2017. This application is also a continuation in part of U.S. Patent Application Ser. No. 62/458,451 entitled MODULAR MANAGED PRESSURE DRILLING CHOKE SYSTEM filed on Feb. 13, 2017.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to managed pressure drilling (MPD) and under balanced drilling (UBD) operations. More specifically, the present invention is related to a modular MPD system and a method of managing pressure with a modular system that allows rig personnel to implement the needed components for the drilling operation. The present invention is also related to a modular MPD system that enables the user to add or remove components needed for the MPD system based upon the drilling conditions of an anticipated project or risk assessment plan and costs for the operation.

SUMMARY OF THE INVENTION

The Modular MPD is a new modular low cost Managed Pressure Drilling manifold that provides a single manifold that can be assembled as 1 full MPD skid incorporating two chokes for 100% equipment redundancy during MPD operations and a full bore bypass line for well conditions not requiring MPD operations. The present invention provides a low cost MPD solution to meet the needs of customers drilling unconventional wells in which the safety benefits of being able to apply surface back pressure are desirable but the cost associated with having a full conventional MPD system is not economically viable.

When combined as a single, assembled MPD skid incorporating multiple chokes, including but not limited to a single choke or two or more chokes, and a full bore bypass line, a remote HMI (human machine interface) controls the unit in conjunction with a coriolis meter skid and programmable PRV (pressure relief valve). Such a system is capable of a full range of MPD operations due to the options provided by the modular components. The manifold will be operated by rig personnel with additional control and monitoring functionality available via the HMI.

The system provides a modular MPD manifold that can be separated into three (3) or more individual skids. The modular MPD system enables the rig personnel to separate the manifold for use as two (2) or more individual single set point manifolds for lower cost simple surface back pressure MPD operations either with or without the bypass and the programmable PRV.

Such versatility allows the manifold to meet the needs of various projects and budgets.

For a single set point choke system, the HMI will be provided directly to the driller for operation. Such a system can serve as an unmanned rental.

Such a modular MPD system provides marketing value by enabling single set point function. If the rig personnel require additional equipment and support, the full system can be readily deployed and integrated to the system.

Users assemble the modular MPD of the present invention from various optional components including a single choke, two or more chokes, a PRV, and a bypass. The user can add the additional components to the manifold while a component remains attached to the flowline of the RCD. The manifold may be assembled to increase the number of components while the manifold is connected to the flowline.

It is an object of the present invention to provide a modular MPD system.

It is also an object of the present invention to provide multiple skids that can be used independently and in coordination with each other.

It is also an object of the present invention to reduce costs of an MPD operation.

It is also an object of the present invention to maximize efficiency of the drilling equipment.

It is also an object of the present invention to provide a modular system that enables the user to customize the configuration needed for the drilling operation.

It is also an object of the present invention to enable rig personnel to quickly and easily add additional skids for the MPD operation if the additional skids are needed.

It is also an object of the present invention to reduce the costs of MPD drilling.

It is also an object of the present invention to reduce the amount of equipment needed at a drilling site to the minimum amount required.

It is also an object of the present invention to provide a low cost MPD solution.

It is also an object of the present invention to maintain the process pressure at or near the set point value.

In addition to the features and advantages of the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The present invention is designed to be as modular and as mobile as possible to allow simple installation of the MPD system at the drilling rig. The MPD system provides separable skids that the user can attach or detach to adjust the functionality of the MPD system. The user may such select optional components such as the additional choke(s), bypass, and PRV.

Such versatility in operation enables the user to acquire the precise amount of equipment needed for the job. If particular equipment is not needed, the users do not require the full configuration. The user can install the skids as necessary. If increased functionality is required at the site, the user simply adds additional components to the system.

Figure 1:
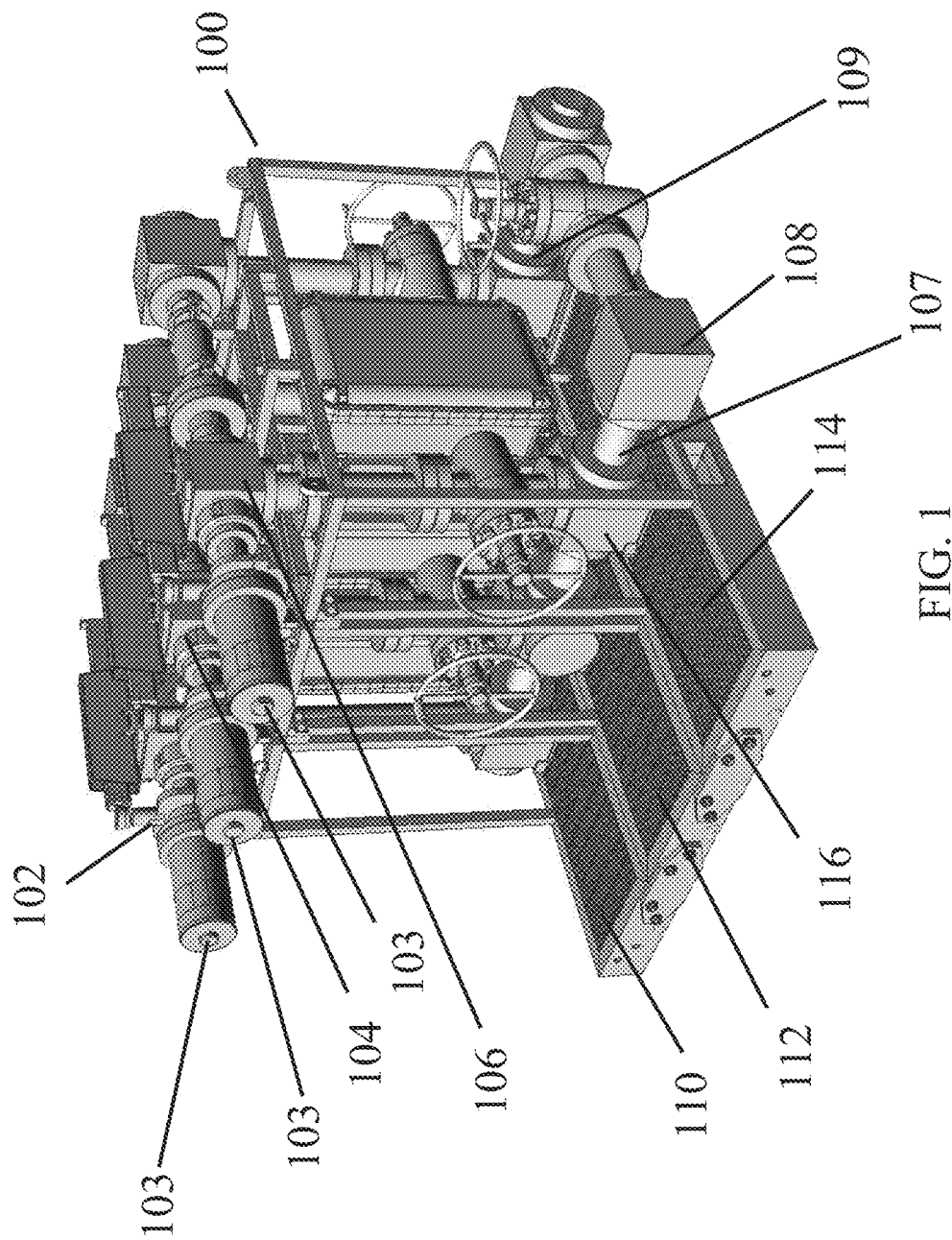
FIG. 1 is a perspective view of one embodiment of the present invention.

FIG. 1 shows the modular MPD system 100. The modular MPD system 100 provides a pressure relieve value 102, an intelligent relief valve in one embodiment, chokes 104, 106, and a bypass 108 with valve. The intelligent PLC controlled pressure relief valve 102 operates within the MPD system 100.

In one embodiment, the chokes 104, 106 are adjusted by linear actuators 103. The linear actuators 103 control the opening of the chokes 104, 106. The actuators 103 open and close the chokes 104, 106. Such linear actuators 103 improve the performance of the chokes 104, 106. The chokes may also be controlled by traditional methods as well.

Each of the choke 104, 106 skids and the optional pressure relieve valve 102 (PRV) skid may be configured as a single skid. In another embodiment, the chokes 104, 106 and the PRV 102 are provided as individual skids 110, 112, 114. The individual skids 110, 112, 114 may be secured together. The skids 110, 112, 114 attach in different configurations to allow for different operating configurations as will be discussed below. The system also enables attachment of bypass 108 to the modular MPD system 100.

The MPD system can utilize various diameter electric linear actuator drilling chokes. The choke of one embodiment operates via a linear actuator to provide additional control, quicker response, and more reliable operation.

The MPD system 100 provides a full bore bypass for increased functionality. The system 100 can be configured for set point control for use by rig personnel. The system 100 may also be integrated as a fully automated MPD system. The modular components, such as the PRV 102, chokes 104, 106, and bypass 108 on individual skids 110, 112, 114 allow the system 100 to be configured for the drilling operation and to reduce the costs associated with drilling.

Figure 2:
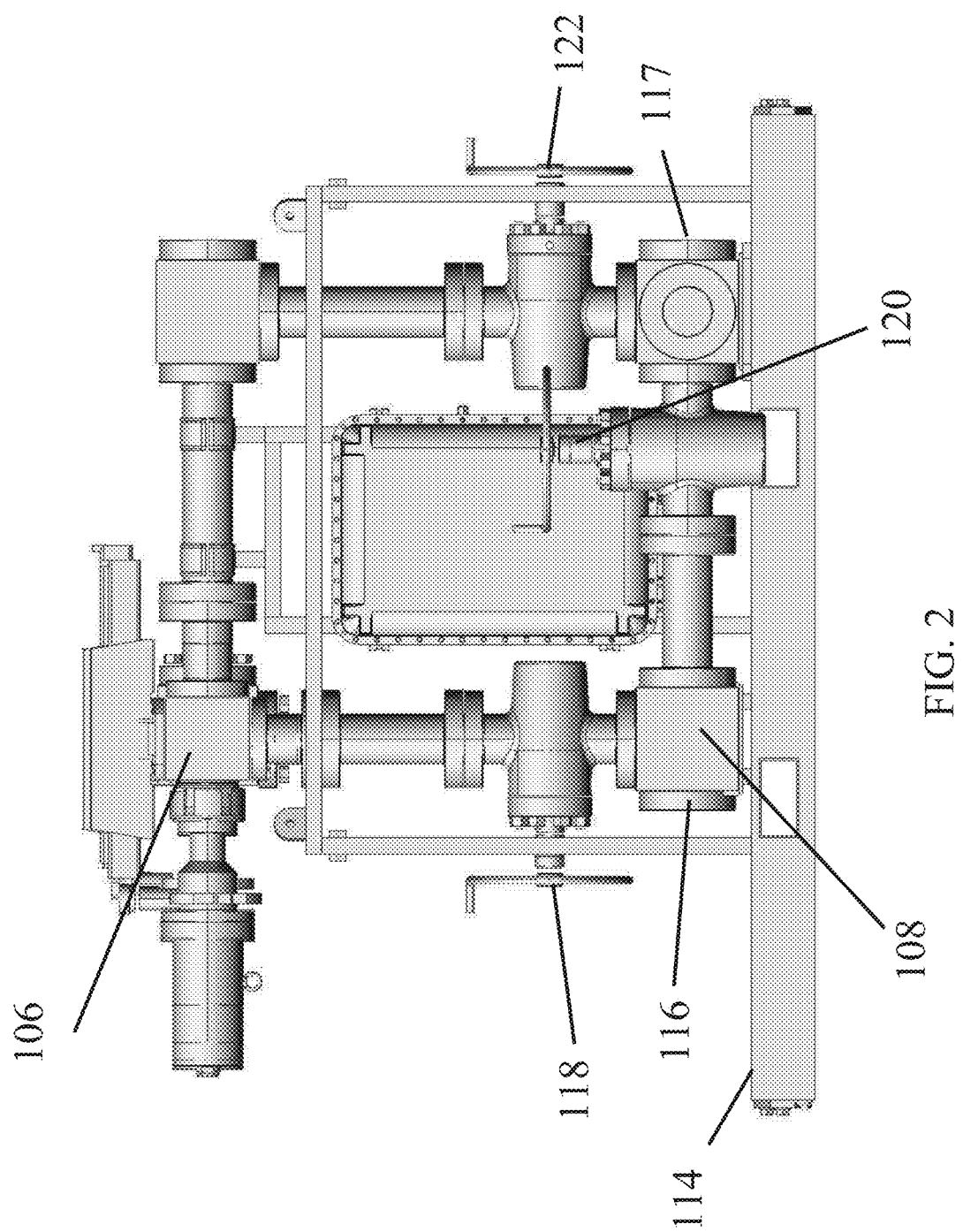
FIG. 2 is a front view thereof.
Figure 3:
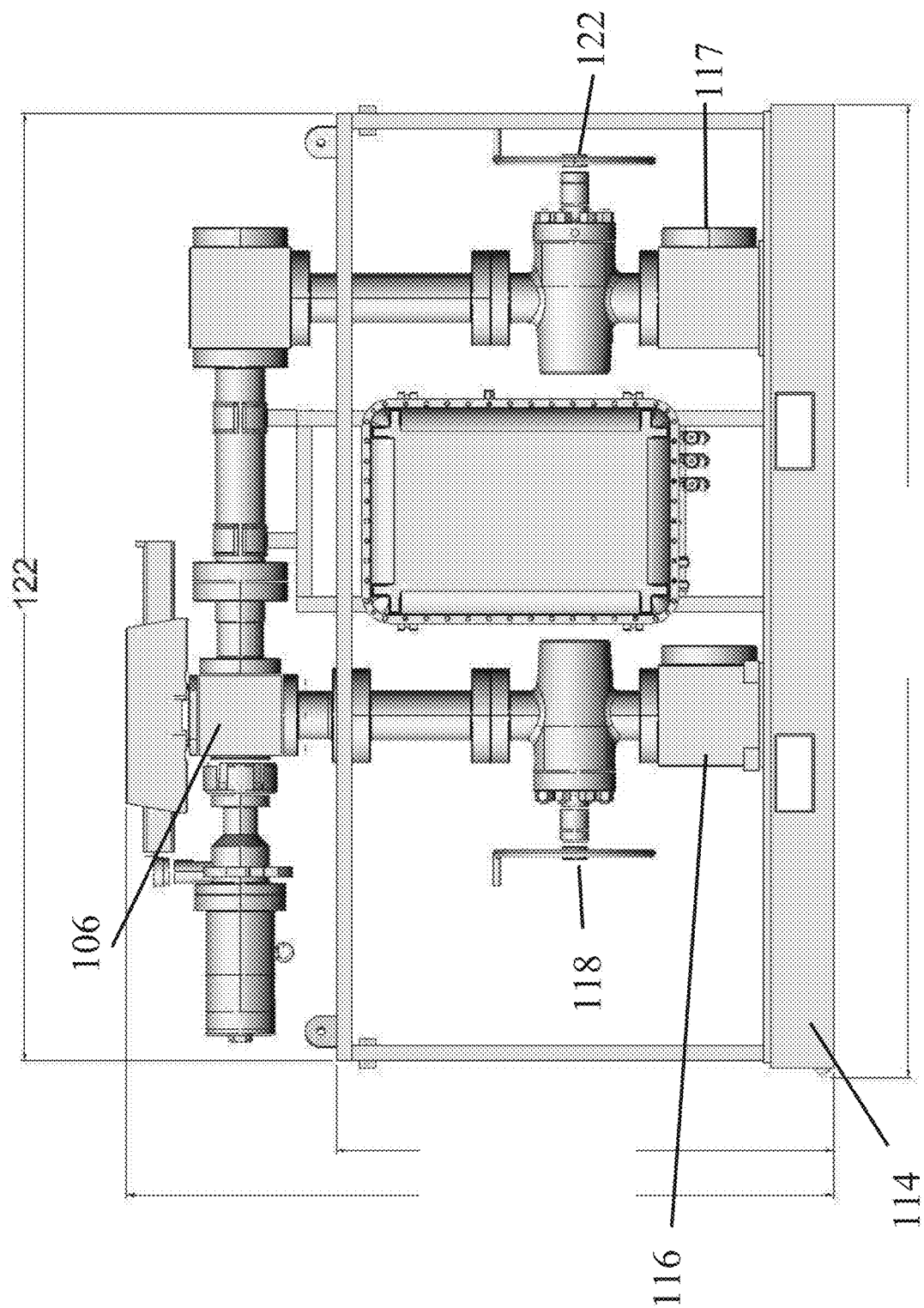
FIG. 3 is a front view thereof.

FIGS. 2 and 3 show a choke 106 on skid 114. FIG. 2 shows the choke 106 assembled with the bypass 108. The choke 106 provides an inlet 116 and outlet 117. Valves 118, 122, 120 control the flow through the choke 106 and bypass 108. The valves of the chokes and bypass may be manually adjusted or automatically actuated.

Figure 4:
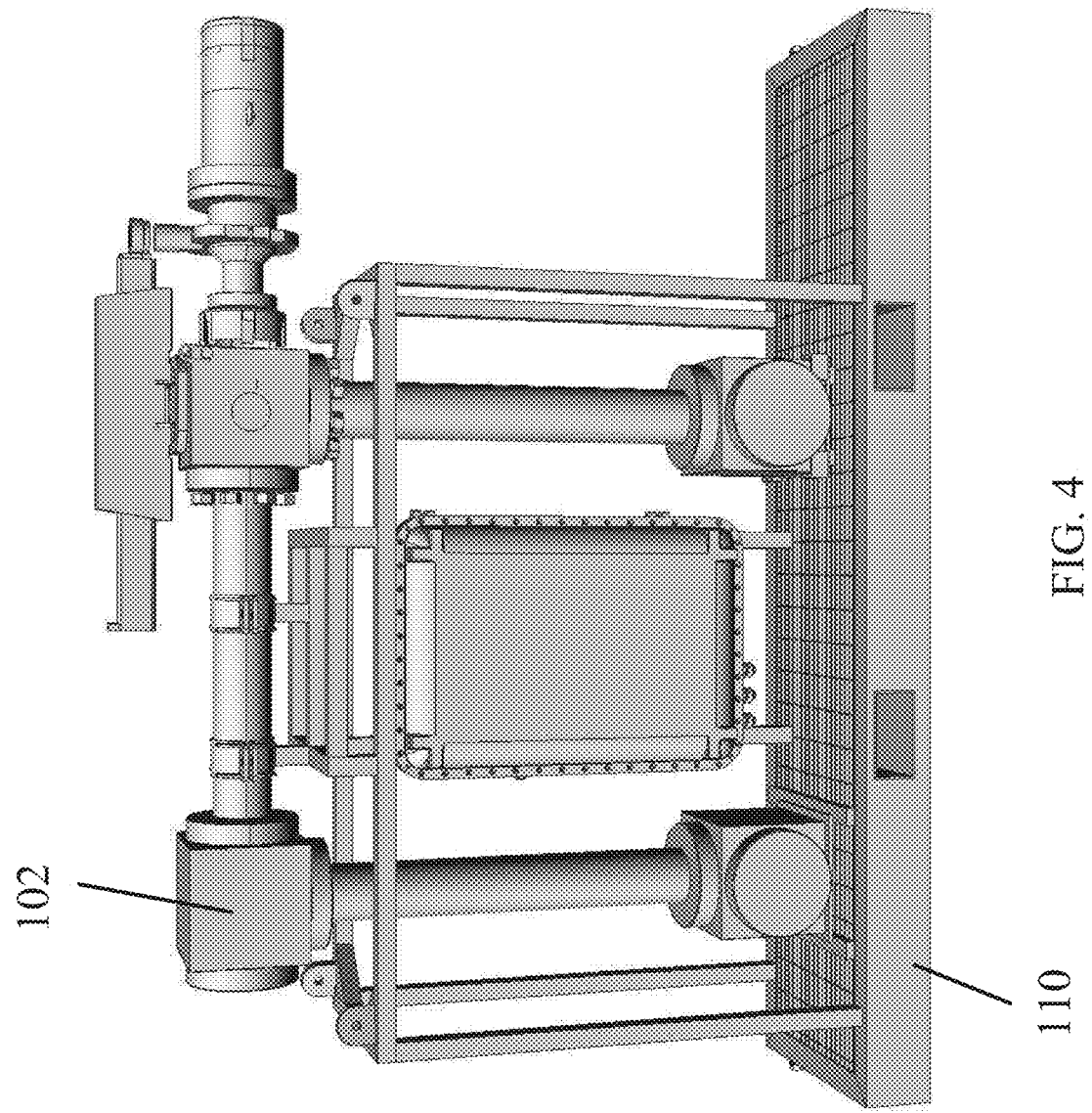
FIG. 4 is a rear perspective view thereof.

FIG. 4 shows a view of the PRV 102 on individual skid 110.

Figure 5:
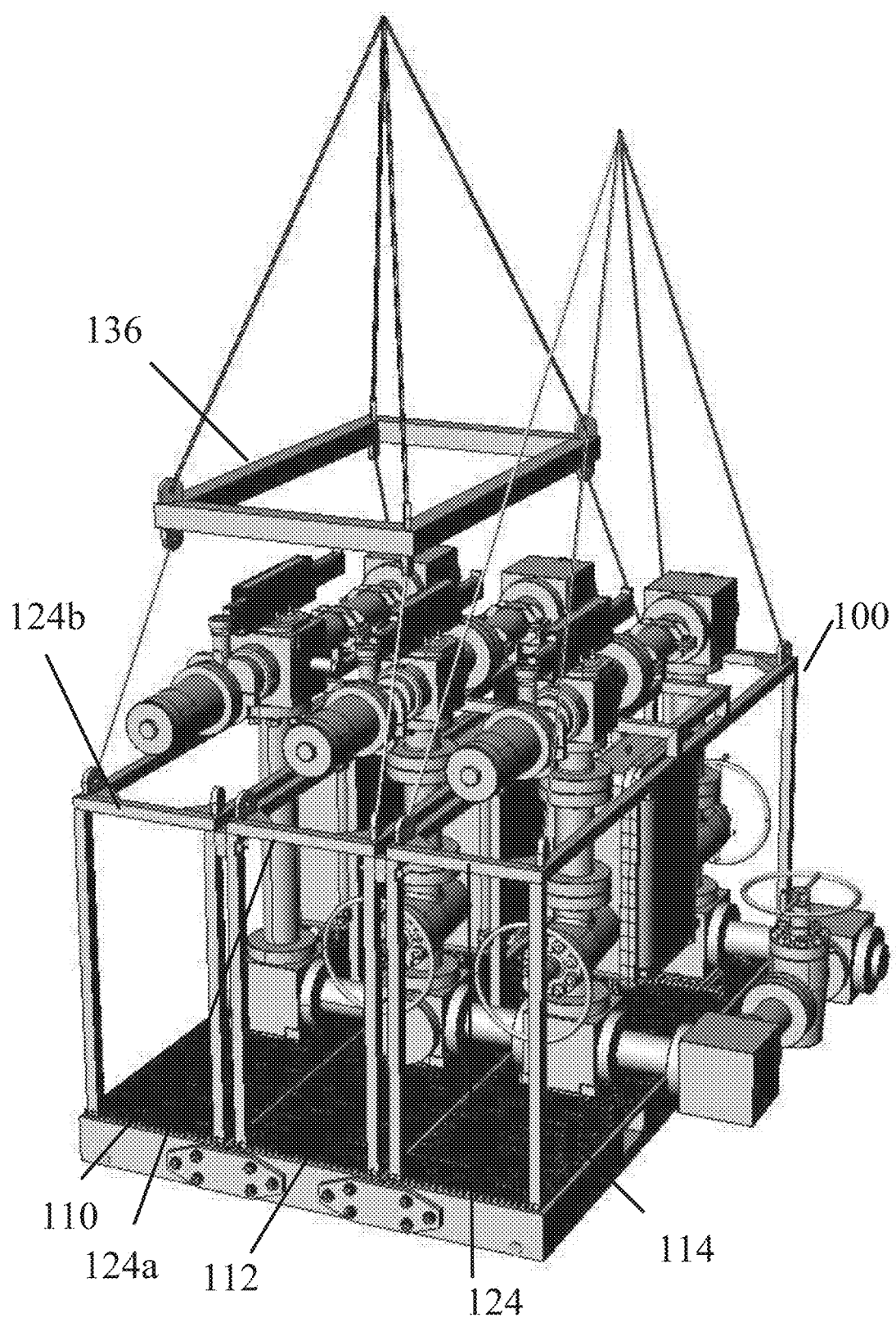
FIG. 5 is an environmental view thereof.
Figure 6:
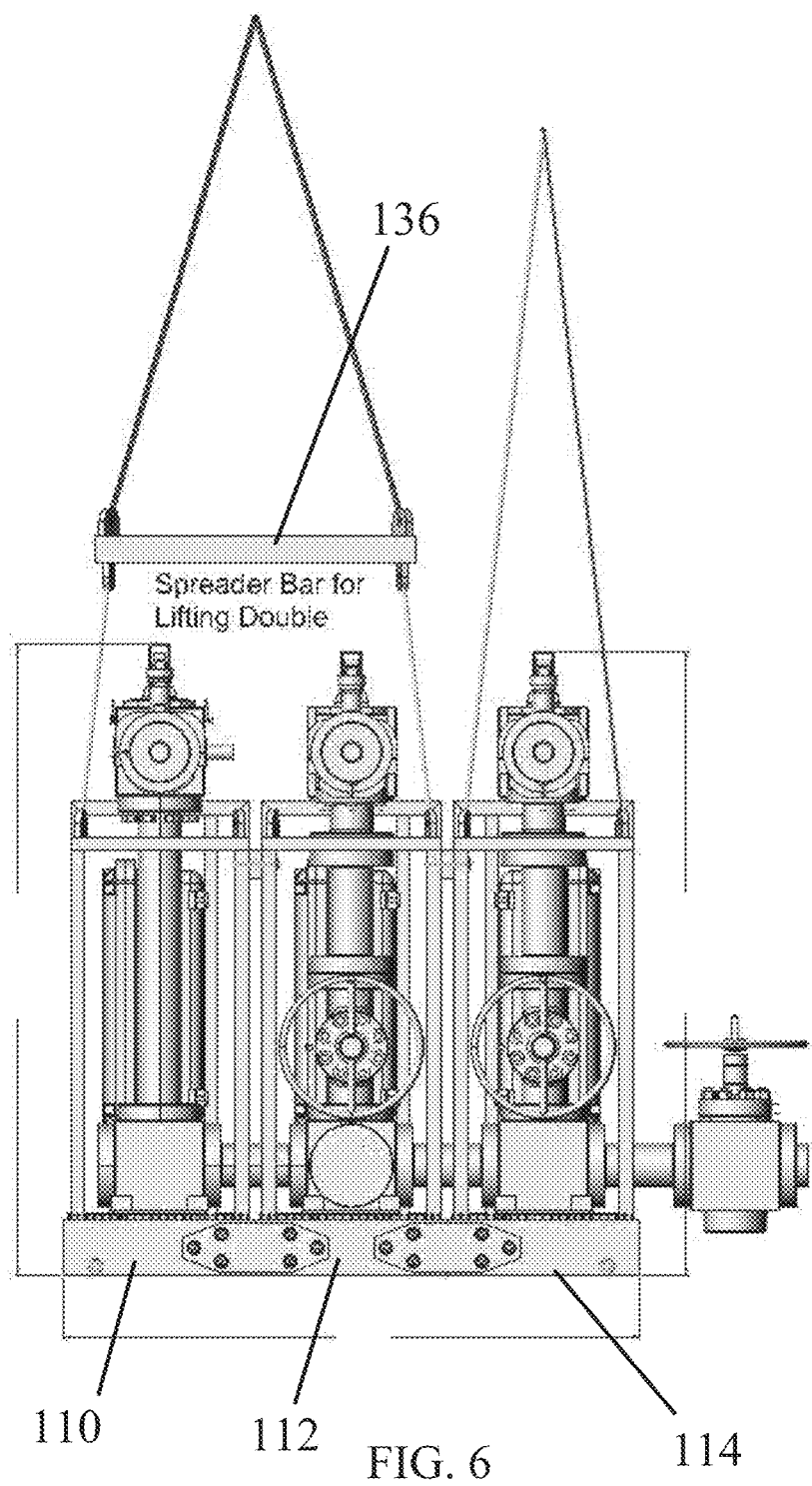
FIG. 6 is an environmental view thereof.

FIGS. 5 and 6 show the skids 110, 112, 114 secured to each other at the base. Support arms 124, 124a, 124b stabilize the top of the skids. The user then attaches the cables, chains, ropes, links, or harness to the skids to lift and move the skids 110, 112, 114 as a system 100.

To lift multiple skids, such as skids 110, 112, a lifting body 136 secures additional cables, etc. to the skids 110, 112, 114 for lifting the system 100.

Figure 7:
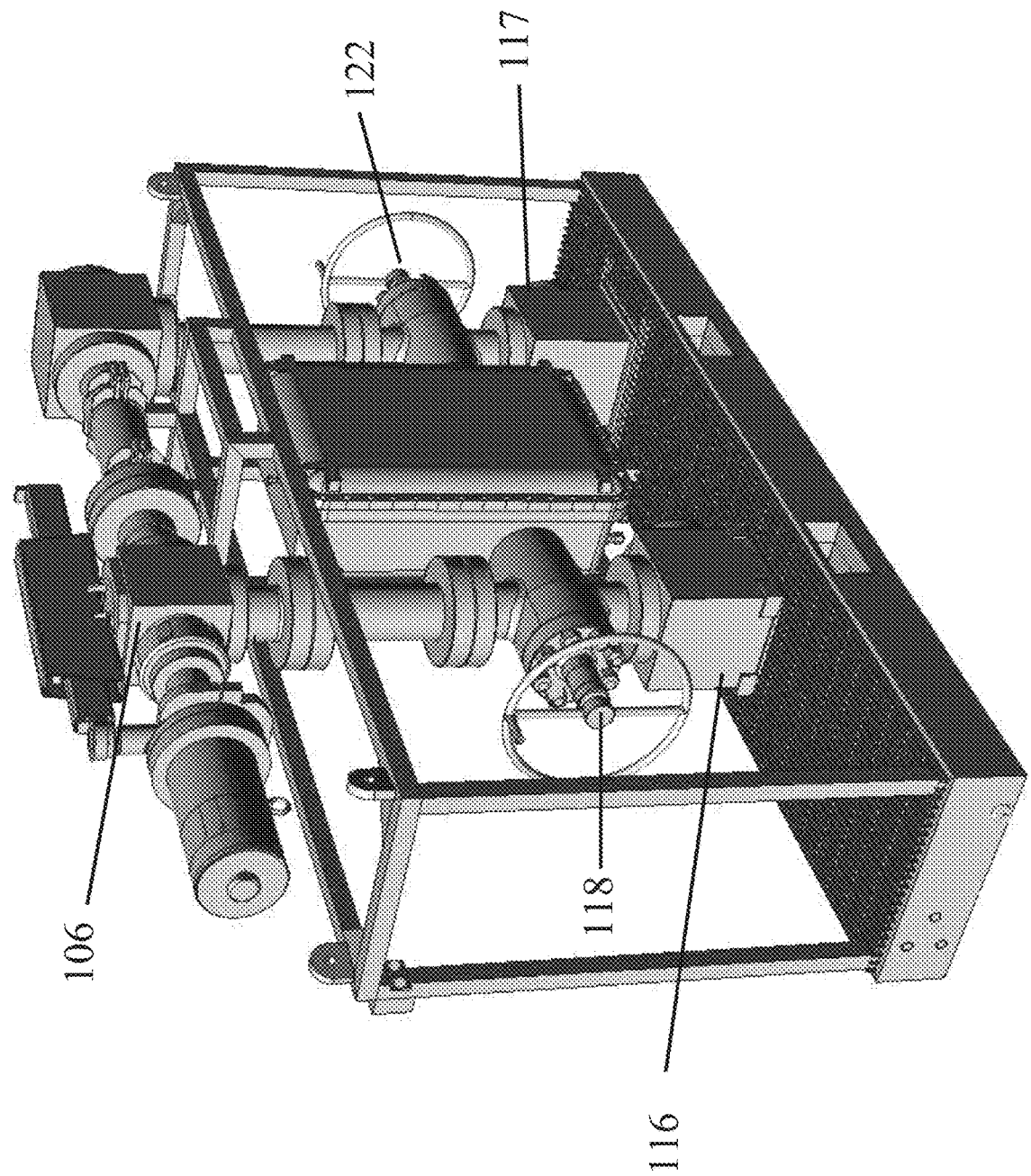
FIG. 7 is a perspective view of one embodiment of the present invention.

FIG. 7 shows a view of the choke 106 and valves 118, 122 with inlet 116 and outlet 117. The valves may open or close depending upon use of the choke 106. In one embodiment, a blank flange seals the inlets and outlets of the components that are not used.

Figure 8:
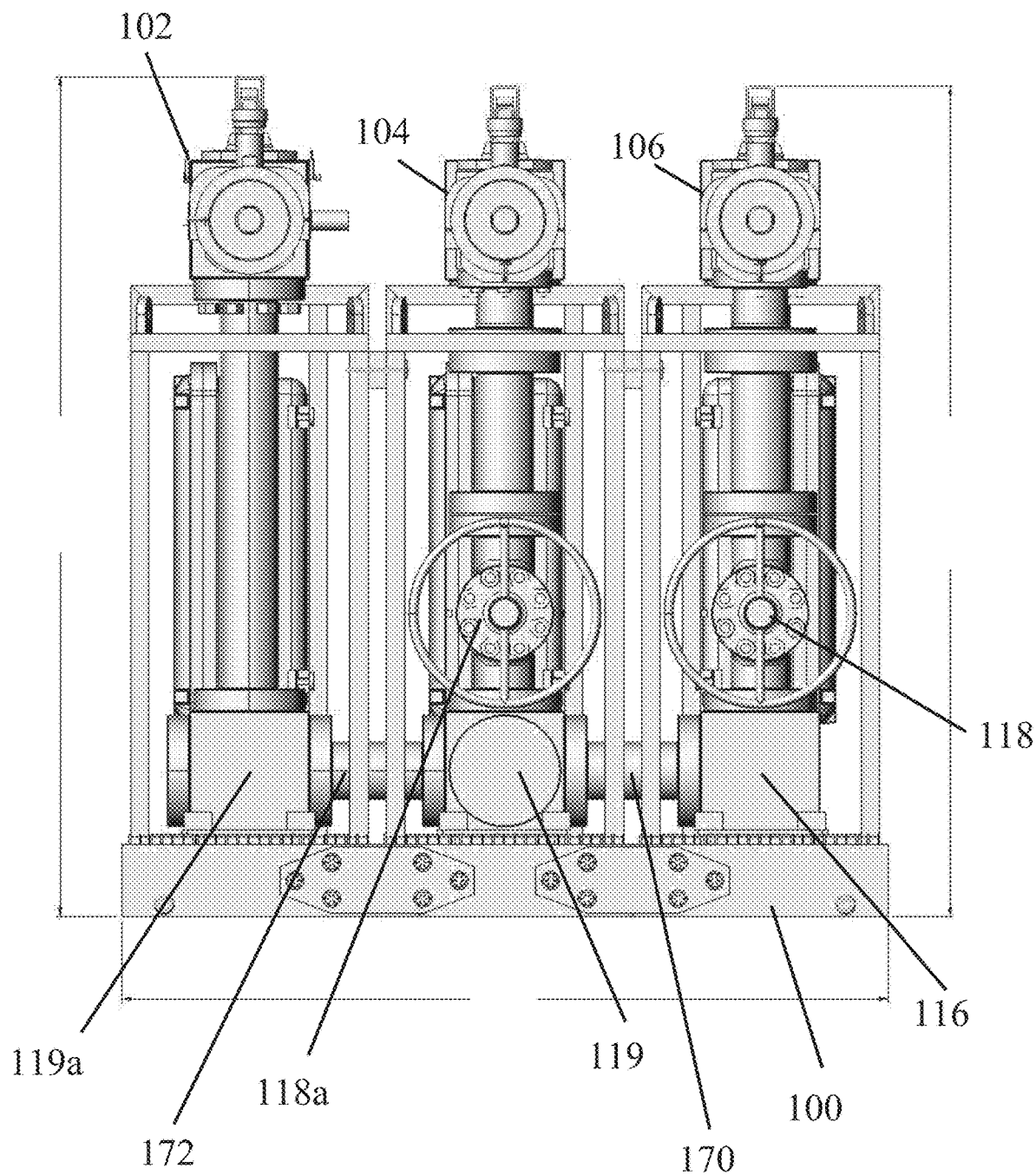
FIG. 8 is a left side view of one embodiment of the present invention.

FIG. 8 shows another view of the MPD system 100 with the chokes 104, 106, PRV 102, and inlet 116 and openings 119, 119a of flow blocks that accept fluids into the respective components. The chokes 104, 106 are utilized by valves 118, 118a. The chokes 104, 106 attach to each other via conduits 170, 172 to allow the fluids to flow through the different chokes 104, 106, and PRV 102 via conduits 170, 172.

Conduits connect the PRV 102, chokes 104, 106, and bypass 108 to each other. Conduits 170, 172 connect the components for operation. The conduits secure at openings within the flange of the components, such as PRV 102 and chokes 104, 106. If no component is attached at the opening of a component placed into operation at the drilling site, the opening is closed with a blank flange.

If a component attaches to another component, two conduits attach the openings of the two components. Two conduits attach each component to each other to allow fluids to flow to the next component and return to the previous component. A sample of the two conduits connecting two components can be seen at conduits 107, 109 of FIG. 1 connecting the choke 106 with bypass 108.

Figure 9:
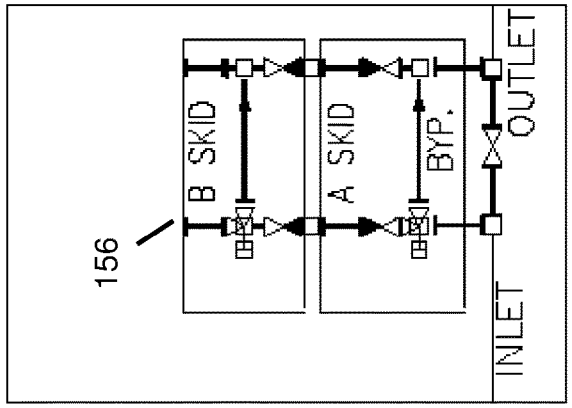
FIG. 9 is a schematic view thereof.
Figure 9:
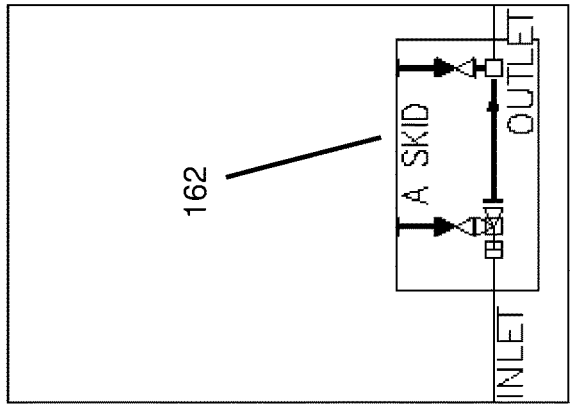
Figure 9:
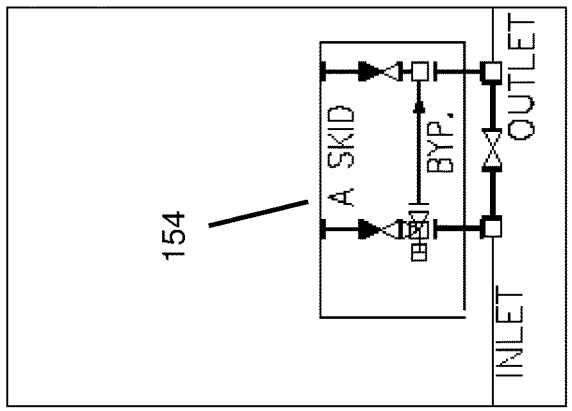
Figure 9:
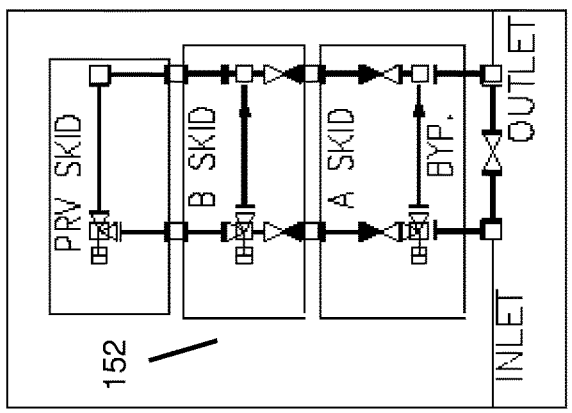
Figure 9:
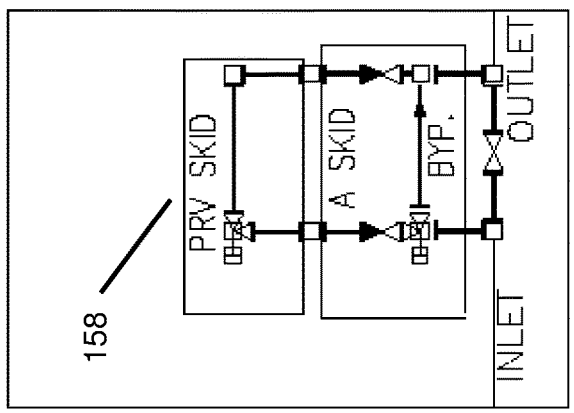

FIG. 9 shows the multiple configurations of the modular MPD system. As discussed above, the modular MPD system enables the user to configure the MPD system for the specific drilling operation. The end user can then select only the necessary equipment for the drilling operation. The user can minimize the usage of equipment to reduce operating costs.

Configurations 152, 154, 156, 158, 162 show the different configurations of the modular MPD system with optional PRV. Configuration 152 is constructed from two chokes, a bypass, and a PRV. Configuration 154 is constructed from a single choke and a bypass. Configuration 156 is constructed from two chokes and a bypass. Configuration 158 is constructed from a bypass, a choke, and a PRV. Configuration 162 is constructed from a single choke.

Many different configurations are possible involving additional chokes. Installing the components, such as the chokes and optional PRV, on individual skids enables multiple configurations. The user can then configure the appropriate setup for the drilling conditions. If the drilling conditions require more components, the user can easily add the additional components to meet the needs required by the drilling conditions. The additional components of one embodiment can be added without requiring disconnection of the MPD manifold from the flowline from the RCD.

Other configurations not shown in FIG. 9 include, but are not limited to:
single choke and PRV;
dual chokes; and
dual chokes and PRV.

Figure 10:
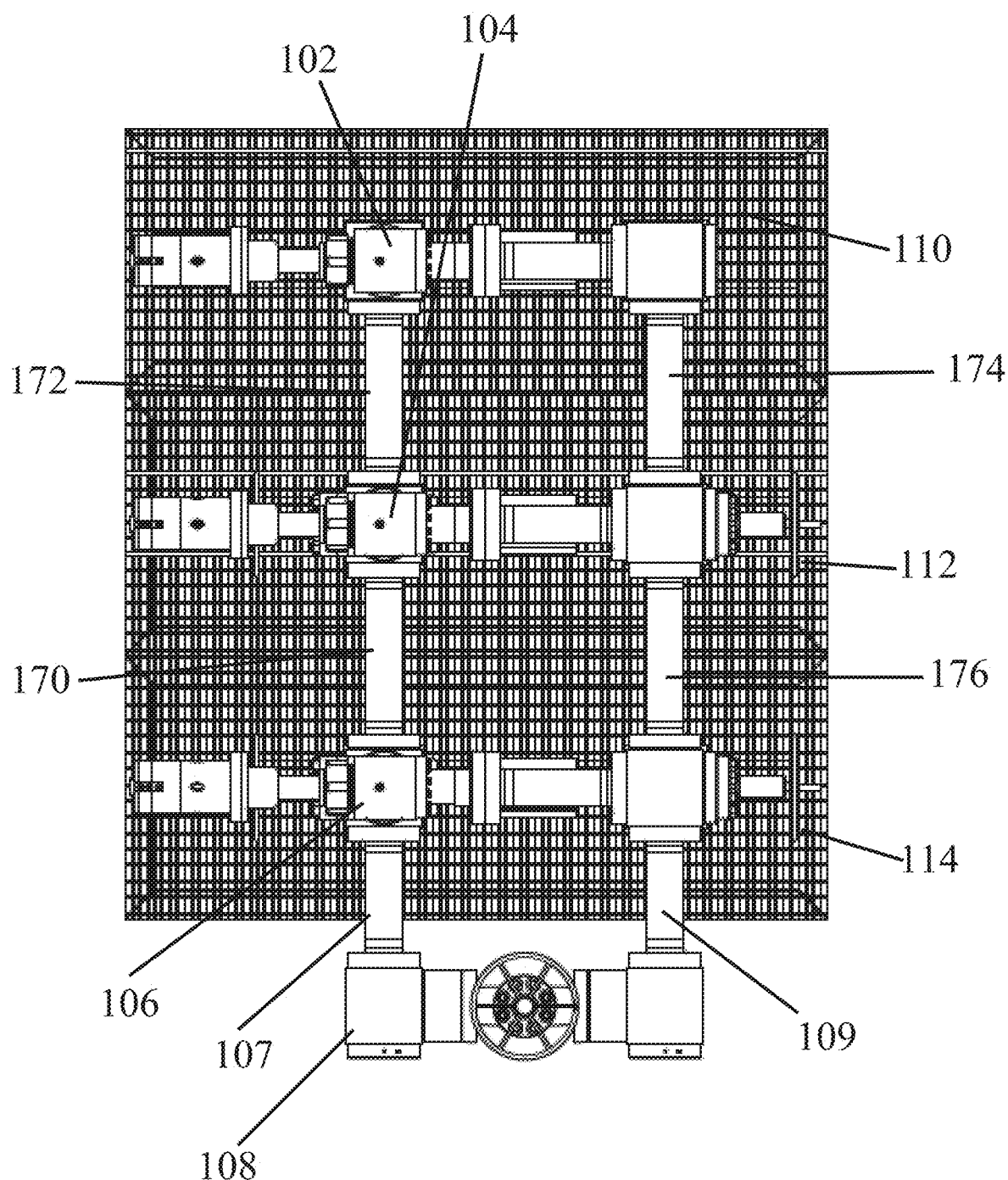
FIG. 10 is a top view thereof.

FIG. 10 shows a top view of one embodiment of the present invention in which PRV 102, chokes 104, 106, and bypass 108 construct the system. Conduits 107, 109 connect the choke 106 with bypass 108. Conduits 170, 176 connect chokes 104, 106. Conduits 172, 174 connect choke 104 with PRV 102.

The fluid flows through conduits 107, 109, 170, 172, 174, 176 to the different components of the system. The fluid enters the system at an inlet of the system. The fluid then travels to the other components at the inlet for each component. In one embodiment, each component provides an inlet and an outlet for fluid to enter and exit the component. In one embodiment, each component provides a first API flow block that serves as an inlet and a second API flow block that serves as an outlet.

Each API flow block provides multiple openings to allow fluid to flow through the flow block in different configurations. These openings may serve as an inlet or an outlet depending on the flow of the fluid through the flow block.

Figure 11:
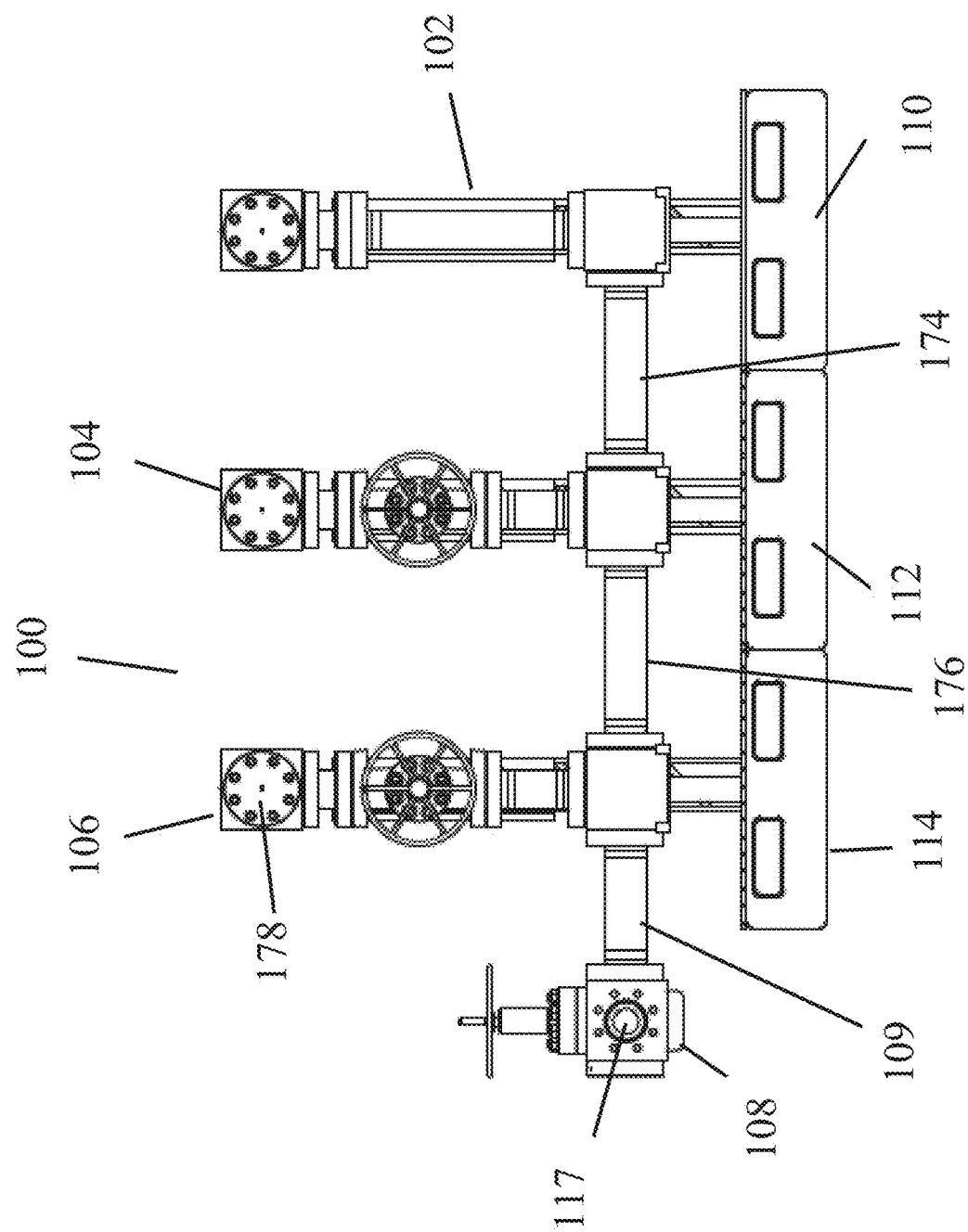
FIG. 11 is a right side view thereof.

FIG. 11 shows the outlet 117 of bypass 108. The fluid flows out from outlet 117 away from the system 100. The fluid passing through the complete system 100 may flow through bypass 108 to chokes 106, choke 104, PRV 102 and return to choke 104, choke 106, and bypass 108. The fluid can flow from PRV 102 to choke 104 through conduit 174. The fluid can flow from choke 104 to choke 106 through conduit 176. The fluid can also flow from choke 106 to bypass 108 through conduit 109 and out outlet 117.

FIG. 11 also shows the components on each individual skid 110, 112, 114. PRV 102 installs onto skid 110. Choke 104 installs onto skid 112. Choke 106 installs onto skid 114.

Figure 12:
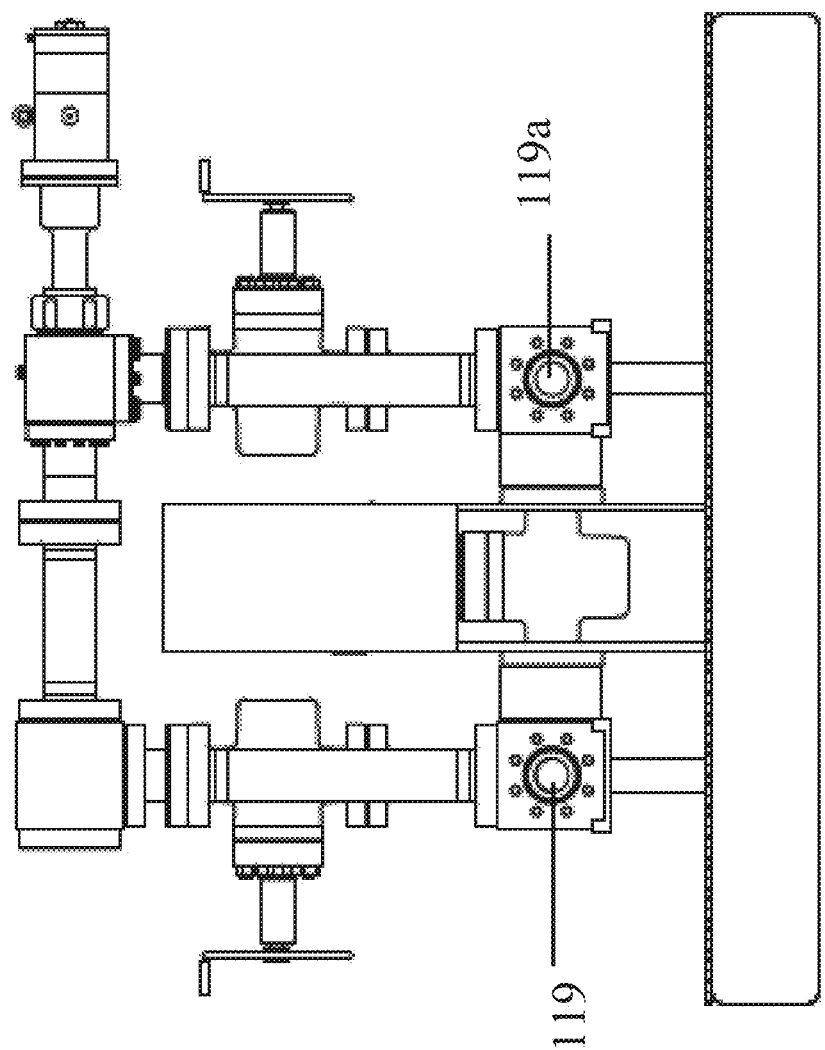
FIG. 12 is a rear view thereof.

FIG. 12 shows the openings 119, 119a of the flow blocks of a choke. The openings 119, 119a are open to allow fluid to flow through the openings 119, 119a of the choke. Conduits attach to the flow blocks at openings 119, 119a for fluid to flow through the openings 119, 119a and the conduits. If another component does not attach to the choke shown in FIG. 12, the user installs a blank flange across openings 119, 119a.

Figure 13:
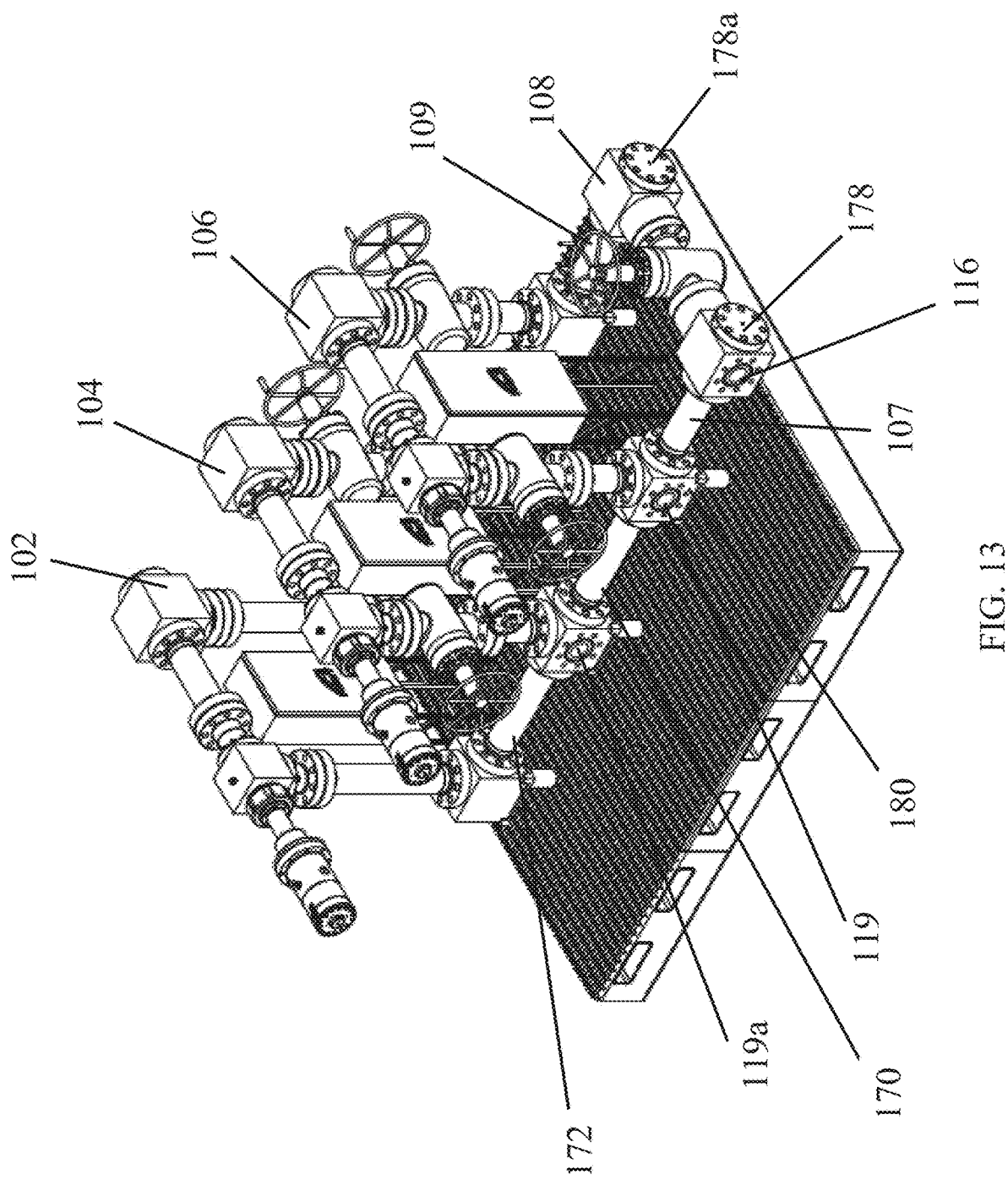
FIG. 13 is a perspective view thereof.
Figure 14:
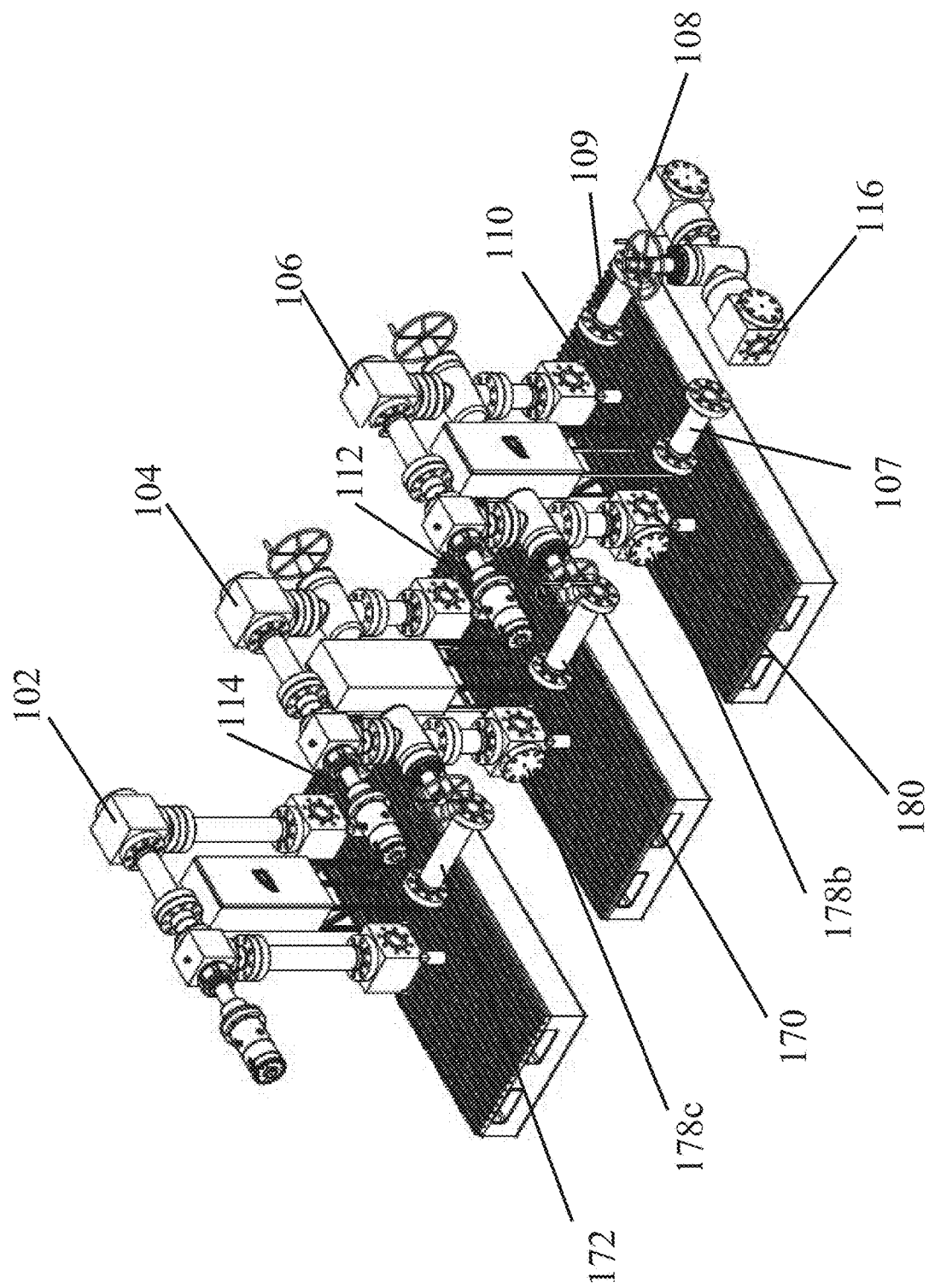
FIG. 14 is an exploded view thereof.

FIGS. 13 and 14 show perspective views of the system. FIG. 13 shows the components connected while FIG. 14 shows an exploded view. Conduits 107, 109, 170, 172 connect the components to one another. Conduits 107, 109 connect bypass 108 to choke 106. Conduit 170 connects chokes 104, 106. Conduit 172 connects choke 104 to PRV 102.

FIG. 13 shows inlet 116 of bypass 108 to which the flowline from the RCD attaches. Openings 119b, 119c in the flow blocks allow attachment of conduits for the flow of fluids into the components. However, such openings 119b, 119c are closed as shown in FIG. 14 with blank flanges 178, 178a.

FIG. 14 shows the exploded view of the connections of the conduits 107, 109, 170, 172 at the openings of the flow blocks 180. The conduits attach at the openings of the flow blocks to control the flow of the fluid through the components.

Figure 15:
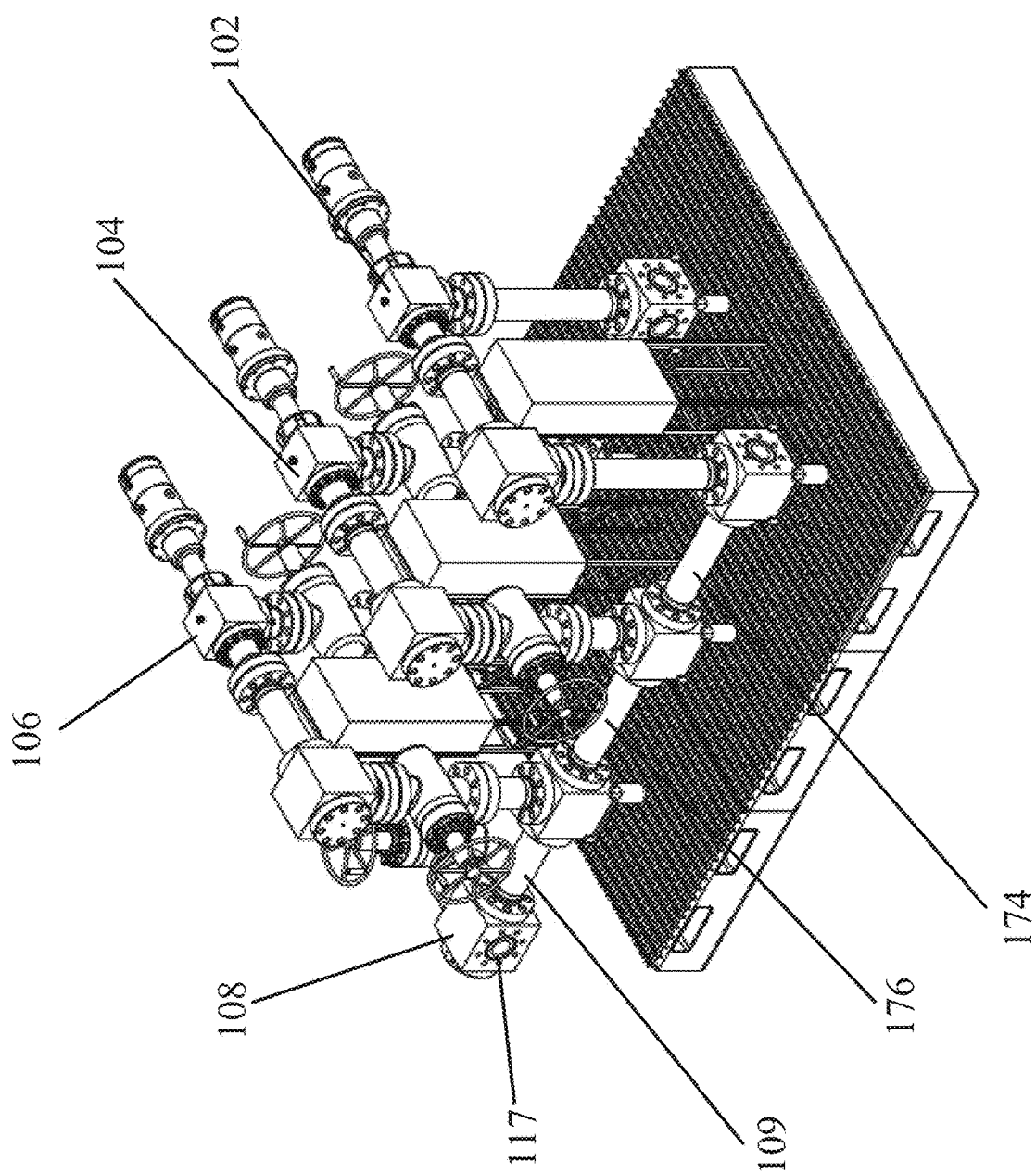
FIG. 15 is a perspective view thereof.
Figure 16:
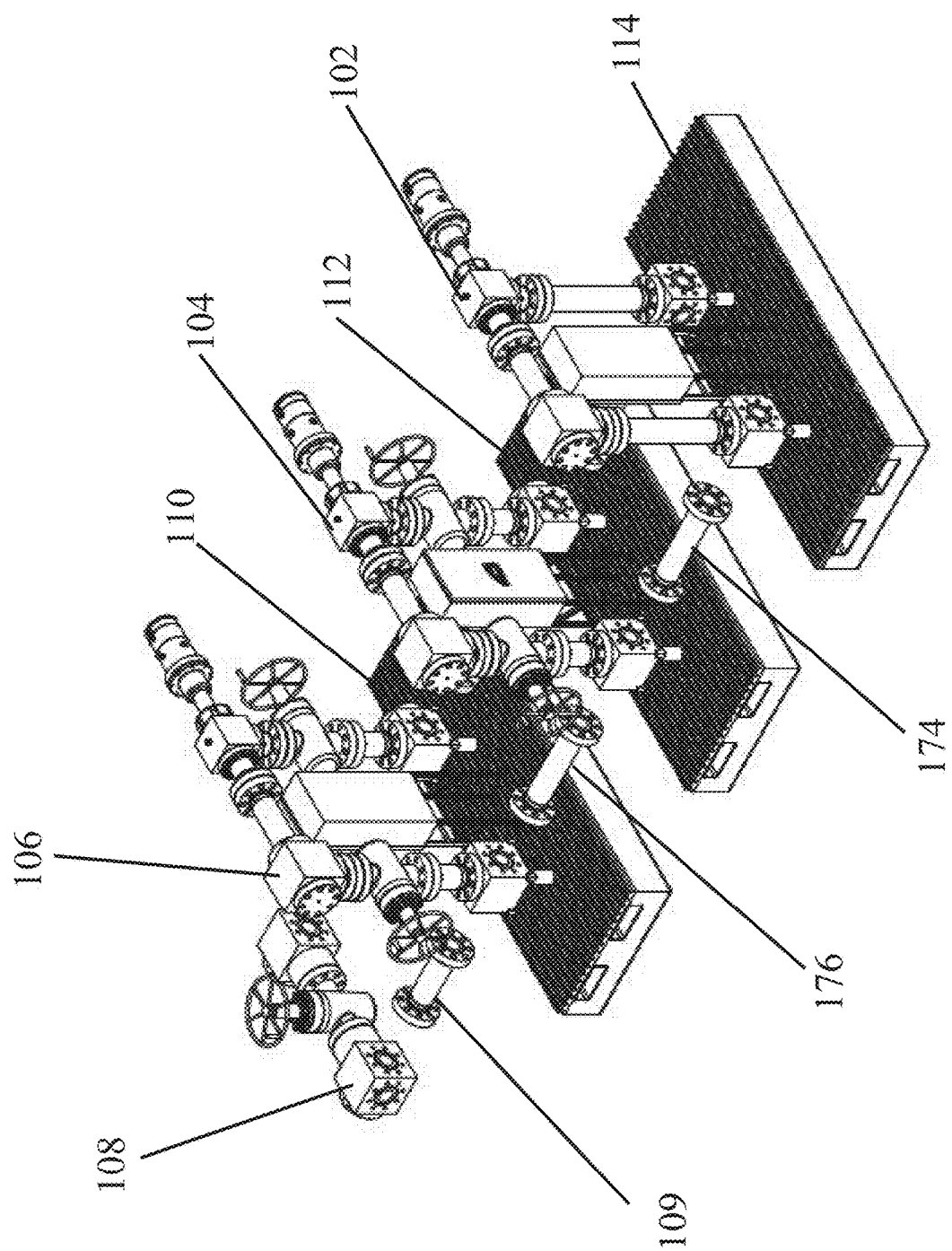
FIG. 16 is an exploded view thereof.

FIGS. 15 and 16 show more perspective views of the system. FIG. 15 shows the components connected while FIG. 16 shows an exploded view. Conduits 109, 174, 176 connect the components to one another. Conduit 109 connects bypass 108 to choke 106. Conduit 176 connects chokes 104, 106. Conduit 174 connects choke 104 to PRV 102.

FIG. 15 shows outlet 117 of bypass 108 directing the fluid to the metering manifold. Openings in the flow blocks allow attachment of conduits for the flow of fluids into the components.

FIG. 16 shows the exploded view of the connections of the conduits 109, 174, 176 at the openings of the flow blocks. The conduits attach at the openings of the flow blocks to control the flow of the fluid through the components.

Continuing to refer to FIG. 16, the openings of the flow blocks of PRV 102 may be closed if no additional components are added onto the side of PRV 102. Otherwise, conduits may attach at the opening of PRV 102 to add additional components to the system at PRV 102.

FIGS. 14 and 16 show the modular components. The individual skids 110, 112, 114 enable different configurations of the components of the system. The user can configure the components needed for the drilling operation. Such modular capability and configurability of the MPD system decreases costs of the operation by allowing the user to install only the required components. If additional components are needed in the future, the user can quickly add the additional components via conduits and the openings of the flow blocks.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A modular managed pressure drilling system for a well, the system comprising:
   a first skid;
   a first choke secured to the first skid;
   a first inlet flow block connected to the first choke wherein the first inlet flow block directs fluid into the first choke from the well, wherein the first inlet flow block provides at least three openings from which the fluid flows through the first inlet flow block into the first choke;
   a first outlet flow block connected to an outlet of the first choke wherein the fluid exits the first choke through the first outlet flow block, wherein the first outlet flow block provides at least three openings from which the fluid may flow through the first outlet flow block;
   a second skid;
   a first component secured to the second skid wherein the fluid flows from the first choke to the first component.

2. The system of claim 1, wherein
   the first outlet flow block connects to the outlet of the first choke wherein the first outlet flow block directs the fluid from the first choke to the first component;

a flange of the first outlet flow block wherein the flange accepts a blank flange to close at least one of the openings of the first outlet flow block.

3. The system of claim 1 further comprising:
a bypass allowing the fluid to bypass the first choke and the first component.

4. The system of claim 3 wherein the bypass is a 4 1/16 inch full bore bypass.

5. The system of claim 1 wherein the first component is a second choke.

6. The system of claim 5 wherein the first choke and the second choke are three inch electrically actuated linear drilling chokes.

7. The system of claim 1 wherein the first component is a pressure relief valve.

8. The system of claim 7 further comprising:
a human machine interface/programmable logic controller (HMI/PLC) connected to the managed pressure drilling system.

9. The system of claim 8 wherein the HMI/PLC controls the pressure relief valve.

10. The system of claim 1 wherein the first skid attaches to the second skid at a base of each skid.

11. The system of claim 1 wherein the first choke is an electrically actuated linear drilling choke.

12. The system of claim 1 wherein the first skid attaches to the second skid at a base of each skid.

13. A modular managed pressure drilling system for a well, the system comprising:
a first skid;
a first choke secured to the first skid;
a first inlet flow block connected to an inlet of the first choke wherein the first inlet flow block directs fluid into the first choke from the well, wherein the first inlet flow block provides at least three openings from which the fluid may flow through the first inlet flow block into the inlet of the first choke;
a first outlet flow block connected to an outlet of the first choke wherein the fluid exits the first choke through the first outlet flow block, wherein the first outlet flow block provides at least three openings from which the fluid may flow through the first outlet flow block;
a second skid attachable to the first skid;
a second choke secured to the second skid wherein the fluid flows from the first choke through the first outlet flow block to the second choke.

14. The system of claim 13, wherein
the first outlet flow block connects to the outlet of the first choke wherein the first outlet flow block directs the fluid from the first choke to the second choke;
a flange of the first outlet flow block wherein the flange accepts a blank flange to close at least one of the openings of the first outlet flow block.

15. The system of claim 13 further comprising:
a bypass connected to the first inlet flow block, the bypass directing the fluid to bypass the first choke and the second choke;
the first inlet flow block directing the fluid to flow in a first direction and a second direction, wherein the first direction directs the fluid through the bypass to bypass the first choke and the second direction directs the fluid through the first choke.

16. The system of claim 13 further comprising:
a third skid attachable to the first and second skid;
a pressure relief valve attached to the third skid.

17. The system of claim 13 wherein the first choke and the second choke are three inch electrically actuated linear drilling chokes.

18. A modular managed pressure drilling system for a well, the system comprising:
a first skid;
a first choke secured to the first skid;
a first inlet flow block connected to an inlet of the first choke wherein the first inlet flow block directs fluid into the inlet of the first choke from the well, wherein the first inlet flow block provides at least three openings from which the fluid may flow through the first inlet flow block into the inlet of the first choke;
a first outlet flow block connected to the an outlet of the first choke wherein the fluid exits the first choke through the first outlet flow block, wherein the first outlet flow block provides at least three openings from which the fluid may flow through the first outlet flow block;
a second skid attachable to the first skid;
a first component secured to the second skid wherein the fluid flows from the first choke to the first component;
the first outlet flow block connected to the outlet of the first choke wherein the outlet flow block directs the fluid from the first choke through the first outlet flow block to the first component;
a flange of the outlet flow block wherein the flange accepts a blank flange to close at least one of the openings of the outlet flow block;
a bypass connected to the first inlet flow block directing the fluid to bypass the first choke and the first component;
wherein the first inlet flow block directs the fluid in a first direction to flow through the bypass to bypass the first choke and a second direction through the first choke.

19. The system of claim 18 further comprising:
a third skid attachable to the first and second skid;
a second component attached to the third skid; and
the bypass directing the fluid to bypass the first choke, the first component, and the second component.

20. The system of claim 19 wherein first component is a second choke and the second component is a pressure relief valve.

* * * * *